United States Patent
Baudry et al.

(10) Patent No.: US 9,394,053 B2
(45) Date of Patent: Jul. 19, 2016

(54) AIRCRAFT HAVING A COCKPIT WITH OPTIMIZED OUTSIDE VISIBILITY AND A METHOD OF OPTIMIZING THE OUTSIDE VISIBILITY

(71) Applicant: AIRBUS HELICOPTERS, Marignane (FR)

(72) Inventors: Jean-Pierre Baudry, Toulon (FR); Nicolas Certain, Aix en Provence (FR)

(73) Assignee: Airbus Helicopters, Marignane (FR)

(*) Notice: Subject to any disclaimer, the term of this patent is extended or adjusted under 35 U.S.C. 154(b) by 281 days.

(21) Appl. No.: 14/224,423

(22) Filed: Mar. 25, 2014

(65) Prior Publication Data

US 2014/0291444 A1  Oct. 2, 2014

(30) Foreign Application Priority Data

Mar. 26, 2013  (FR) .................................... 13 00699

(51) Int. Cl.
- *B64D 11/00* (2006.01)
- *B64D 11/06* (2006.01)
- *B64C 1/14* (2006.01)

(Continued)

(52) U.S. Cl.
CPC .......... *B64D 11/0689* (2013.01); *B64C 1/1492* (2013.01); *B64C 27/04* (2013.01); *B64D 13/06* (2013.01); *B64D 43/00* (2013.01); *B64D 45/00* (2013.01)

(58) Field of Classification Search
CPC .... B64D 11/0689; B64D 13/06; B64D 43/00; B64D 45/00; B64C 1/1492; B64C 27/04

USPC .............................. 248/694; 244/118.5, 129.1
See application file for complete search history.

(56) References Cited

U.S. PATENT DOCUMENTS 3,572,615 A  3/1971 Firestone
3,643,889 A  2/1972 Krause
(Continued)

FOREIGN PATENT DOCUMENTS

EP  0064351 A1  11/1981
EP  0064351     11/1982
(Continued)

OTHER PUBLICATIONS

International Bulletin "Introduction of aircraft" (opened to the public on Nov. 6, 2012), Flight Institute, Eurocopter EC 155, http://flightin.com/boxi/bbs/board.php?bo_table=m49&wr_id=164, 2 Pages.
(Continued)

*Primary Examiner* — Anita M King
(74) *Attorney, Agent, or Firm* — Brooks Kushman P.C.

(57) ABSTRACT

An aircraft having a cockpit, said cockpit including a canopy provided with transparent surfaces fastened to bars, a central console, and two seats arranged transversely on either side of the central console. The aircraft includes at least one support (31, 33) connected to the central console and at least one display unit for displaying multiple indications for assisting piloting, each display unit being carried by at least one support (31, 32, 33, 34) interposed between a bar and a theoretical position of the eye of a person sitting on one of said two seats, each support (31, 32, 33, 34) visually masking a bar at least in part, in order to optimize the visibility to the outside of the cockpit as made available to that person, the theoretical position being defined by the manufacturer.

17 Claims, 5 Drawing Sheets

(51) Int. Cl.
*B64D 43/00* (2006.01)
*B64D 13/06* (2006.01)
*B64D 45/00* (2006.01)
*B64C 27/04* (2006.01)

(56) References Cited

U.S. PATENT DOCUMENTS

| | | | |
|---|---|---|---|
| 4,535,713 A | 8/1985 | Van Roon | |
| 4,780,838 A | 10/1988 | Adelson | |
| 5,065,976 A * | 11/1991 | Woody | B64D 43/00 244/118.5 |
| 8,590,839 B2 * | 11/2013 | Giannelli | B64D 43/00 244/129.1 |
| 2003/0127557 A1 | 7/2003 | Anderson et al. | |
| 2004/0172896 A1 | 9/2004 | Steed et al. | |
| 2006/0108873 A1 * | 5/2006 | Hamasaki | B64D 43/00 307/10.1 |
| 2011/0084106 A1 * | 4/2011 | Bopp | B60R 11/0252 224/563 |
| 2012/0075120 A1 | 3/2012 | Barbieri | |
| 2012/0217345 A1 | 8/2012 | Stucki | |
| 2013/0148325 A1 * | 6/2013 | Guering | B60K 37/00 361/809 |
| 2014/0209740 A1 * | 7/2014 | Guering | B64D 43/00 244/118.5 |

FOREIGN PATENT DOCUMENTS

| | | |
|---|---|---|
| EP | 2361832 | 8/2011 |
| EP | 2361832 A1 | 8/2011 |
| FR | 2465641 | 3/1981 |
| FR | 2585823 | 2/1987 |
| FR | 2585823 A1 | 2/1987 |
| FR | 2965248 | 3/2012 |
| GB | 491358 | 8/1938 |
| KR | 101242747 B1 | 3/2013 |

OTHER PUBLICATIONS

Chinese First Office Action Dated Oct. 10, 2015, Application No. 201410113903.0, Applicant Airbus Helicopters, 5 Pages.
Korean Notice of Preliminary Rejection Dated Oct. 23, 2015, Application No. 10-2014-0029871, Applicant Airbus Helicopters, 3 Pages.
French Search Report for FR 1300699, Completed by the French Patent Office on Jan. 7, 2014, 12 Pages.

* cited by examiner

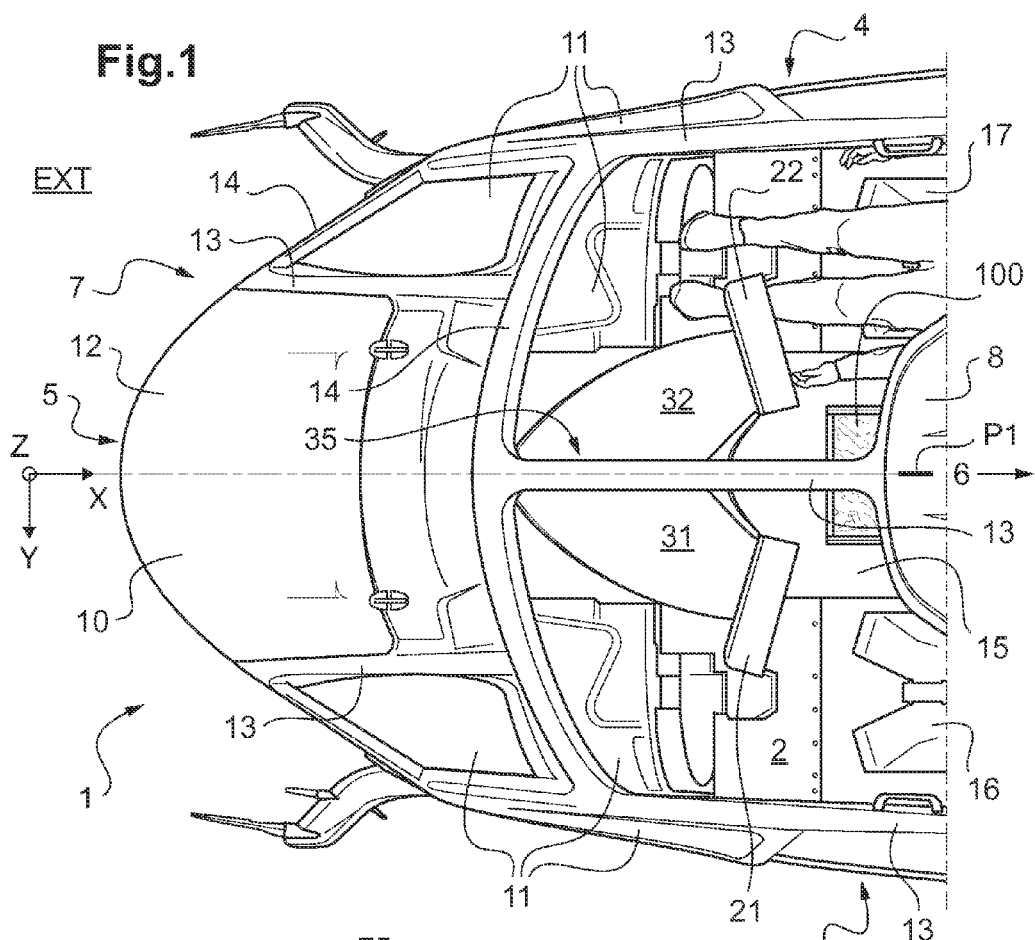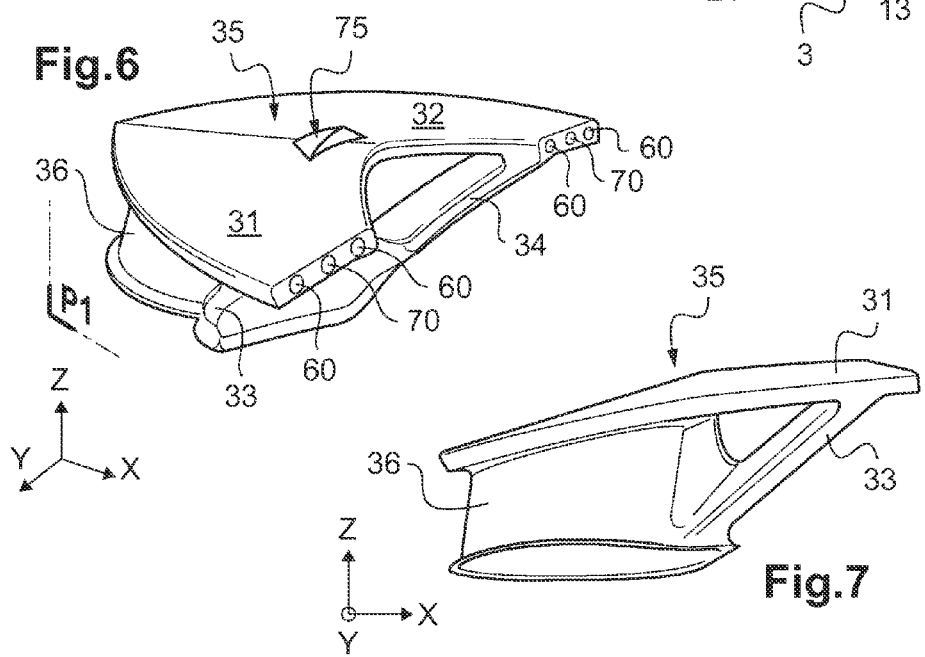

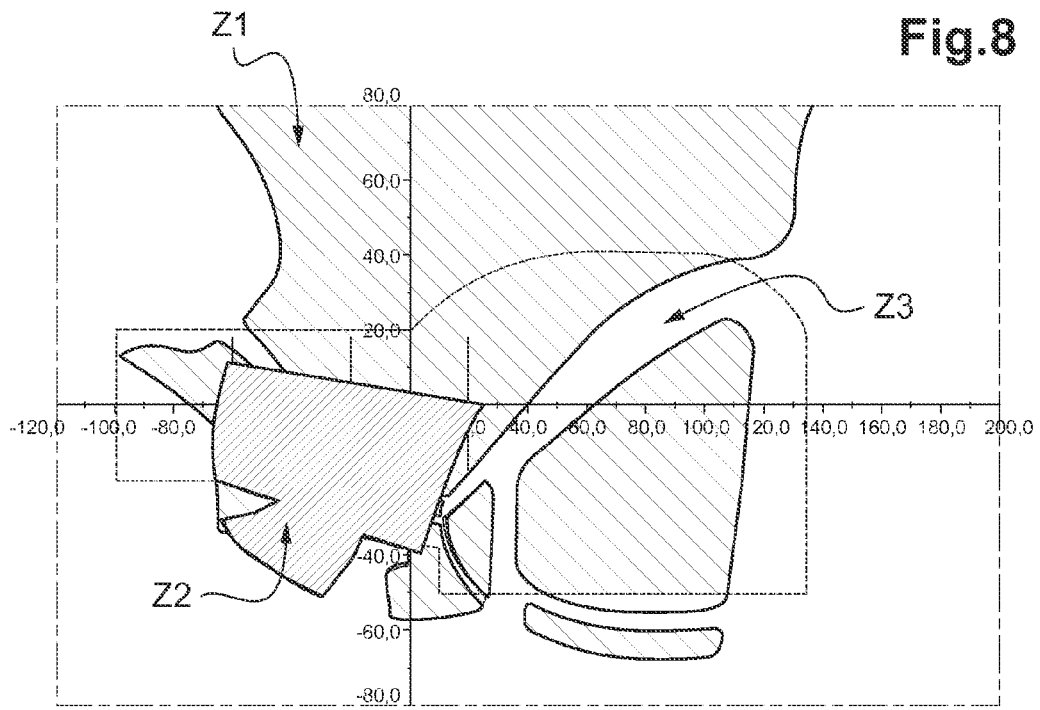
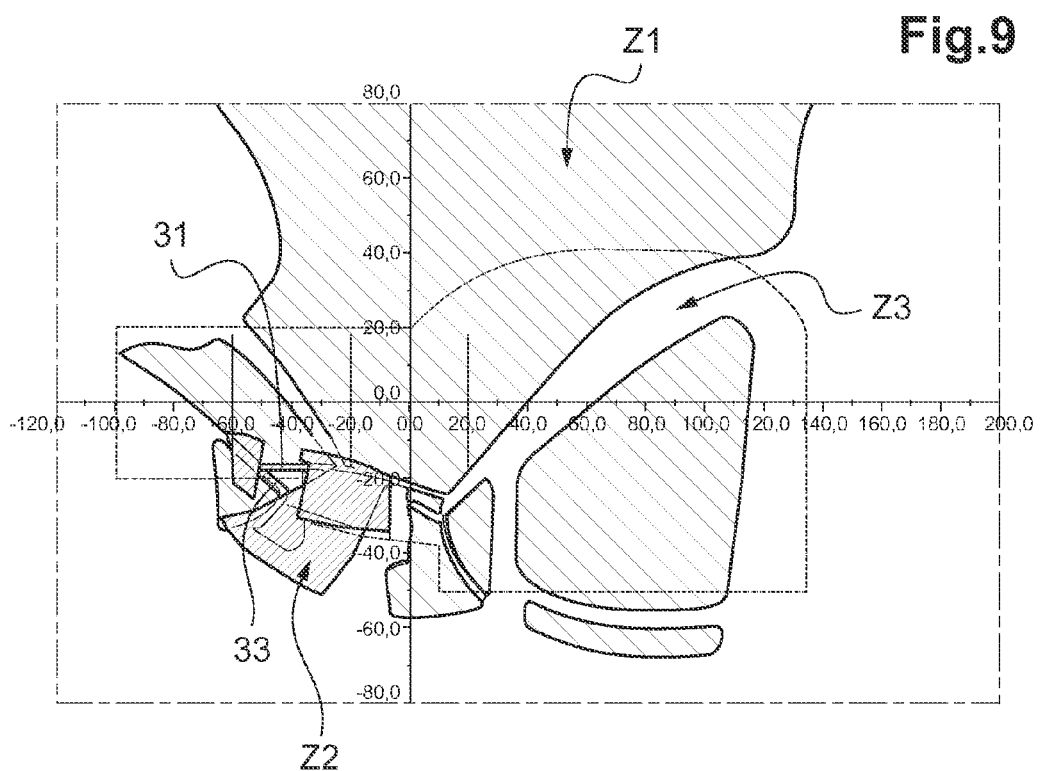

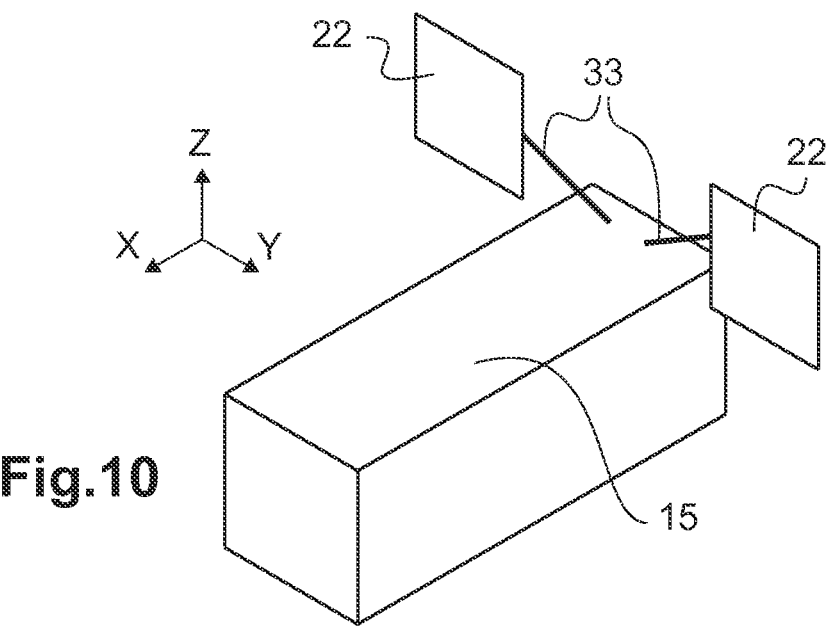
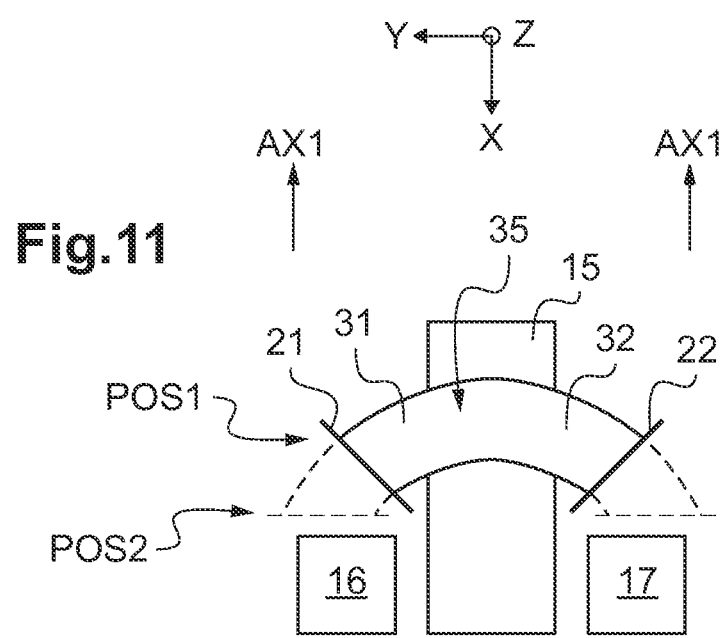

AIRCRAFT HAVING A COCKPIT WITH OPTIMIZED OUTSIDE VISIBILITY AND A METHOD OF OPTIMIZING THE OUTSIDE VISIBILITY

CROSS REFERENCE TO RELATED APPLICATION

The present application claims priority to French patent application FR 13 00699 filed on Mar. 26, 2013, the disclosure of which is incorporated in its entirety by reference herein.

BACKGROUND OF THE INVENTION (1) Field of the Invention

The present invention relates to an aircraft having a cockpit with optimized outside visibility, and to the method applied for optimizing said outside visibility of a pilot.

(2) Description of Related Art

The invention thus lies in the technical field of aircraft cockpits, and more particularly of rotorcraft cockpits.

An aircraft usually has a plurality of instruments providing indications to a pilot. By way of example, there may be navigation instruments or indeed instruments for monitoring a power plant.

Old generation rotorcraft are used essentially for visual flight rules (VFR) flights. Such rotorcraft have relatively few on-board instruments arranged on an instrument panel. In a cockpit having two seats side by side and separated by an inter-seat space, the instrument panel is situated in a central zone of the cockpit extending the inter-seat space. Forward visibility for a pilot is then relatively good.

New generation rotorcraft make it possible to perform instrument flight rules (IFR) flight. Under such circumstances, these rotorcraft have a greater number of instruments. The instrument panels have thus been extended transversely.

Rotorcraft are thus known having an instrument panel extending on either side of a central zone so as to carry instruments in front of a pilot. The pilot's visibility towards the outside of the cockpit on the forward axis of the rotorcraft is thus obstructed by said instrument panel, at least in part.

In order to authorize IFR flights and in particular to do so independently of outside conditions (bad weather, poor visibility, . . . ), rotorcraft have thus been fitted specifically with new instruments, in ever greater numbers, tending to limit the outside visibility of a pilot. Nevertheless, for most of the time, the aircraft flies under VFR conditions.

Consequently, the prior art describes aircraft giving good outside visibility but a narrow mission spectrum, and aircraft providing moderate outside visibility but with a wider mission spectrum.

In particular, documents U.S. Pat. No. 3,572,615 and U.S. Pat. No. 3,643,899 present an airplane having an instrument panel and an instrument box arranged above the level of a pilot's eyes in order to avoid obstructing the pilot's field of view.

Instruments may also be fastened on a bar extending in elevation.

Document US 2012/0217345 describes a cockpit having a central console arranged in the extension of an inter-seat space. The floor of the cockpit presents observation means in the inter-seat space to give the pilot a field of view underneath the aircraft.

Document GB 491 358 presents a cockpit defined in particular by a transparent bubble.

Document FR 2 965 248 presents an instrument panel.

Document FR 2 465 641 is remote from the technical field of the invention. That document FR 2 465 641 describes a wheelhouse for a boat having instruments that are fastened to a ceiling.

Initially, a large amount of equipment (air conditioning system, . . . ) that used conventionally to be positioned in the nose of an aircraft, behind conventional instrument panels, was moved into the cabin (or hold). That has made potential outside visibility greater. Nevertheless, potentially bulky and heavy connections might then need to run along the inside of the aircraft.

BRIEF SUMMARY OF THE INVENTION

An object of the present invention is thus to propose an aircraft provided with a cockpit giving optimized outside visibility towards the front during VFR flight, while also providing a pilot with information during IFR flight by minimizing the impact of the instruments on said outside visibility.

According to the invention, an aircraft is provided with a cockpit extending longitudinally from a rear portion towards a front portion and transversely from a left side towards a right side, and in elevation from a base towards a top, the cockpit comprising a canopy having transparent surfaces fastened to bars, the cockpit including a central console and two seats arranged transversely on either side of the central console.

The aircraft is remarkable in particular in that it includes at least one support connected to the central console and at least one display unit for displaying multiple indications for assisting piloting, each display unit being carried by at least one support, each support being interposed between a bar and a theoretical position for the eye of a person sitting on one of said two seats, each support visually masking a bar at least in part (i.e. being superposed therewith) in order to optimize the outside visibility made available to that person, the theoretical position of the eye being defined by the manufacturer.

Consequently, the canopy of the aircraft has masks that obstruct the field of view of a person sitting on one of the two front seats of the cockpit. For example, the field of view of a pilot, of a copilot, or indeed of an operator such as a doctor sitting on a front seat is already obstructed in part by the structural bars of the canopy.

Furthermore, the field of view of such a person is also conventionally obstructed in the prior art by the instrument panel.

In contrast, the invention proposes not using an instrument panel as in the prior art, but rather proposes arranging at least one display unit. More precisely, the cockpit may have one display unit presenting indications to a pilot, or indeed two display units respectively presenting indications to a pilot and to an assistant, such as a copilot.

In addition, each display unit is carried by at least one support fastened to the central console directly or indirectly by a fastener member. Such a support is then arranged in a person's theoretical line of vision that passes through a bar. Thus, the support is positioned in such a manner as to avoid adding any additional masking to the field of view of a pilot, for example, by superposing the mask generated by the support on the mask generated by a bar.

To this end, each support is positioned between a bar and the theoretical position of a person on a line of sight between that person's eyes and the bar.

Specifically, the aircraft has a seat referred to as the "right" seat receiving a first person on the right side of the aircraft, and a seat referred to as the "left" seat receiving a second person on the left side of the aircraft. The terms "right" and "left" should be considered as a function of the forward direction of the aircraft the left side being situated on the left of an anteroposterior plane for an operator looking towards the front of the aircraft.

Under such circumstances, the aircraft may have at least one right support for carrying a right display unit for displaying indications for a first person, and at least one left support for carrying a left display unit for displaying indications for a second person.

By way of example, the right support may then be positioned on the line of sight of the second person looking towards a bar situated on the right side of the cockpit so as to minimize the impact of the means supporting the left display unit on the field of view of the second person when looking towards the front and towards the left. Likewise, the left support may be positioned on the line of sight of the first person looking towards a bar situated on the left side of the cockpit.

Consequently, the aircraft serves to increase the field of view to the left for a person sitting on the right side of the aircraft compared with certain prior art configurations, and to increase the field of view to the right for a person sitting on the left side of the aircraft.

Thus, each display unit may present a person with indications needed for IFR flight while limiting the masking of vision as generated by the display system, so as to facilitate VFR flight conditions.

For example, in the prior art, the pilot sometimes makes the aircraft perform a yaw movement in order to cause the aircraft to "skid" so that the pilot can see a landing area. The increase in the field of view made available by the invention can avoid the need to perform such a maneuver by providing a field of view that is greater than in the prior art.

In addition, the bars include at least one transverse bar extending transversely in a direction from the left side towards the right side, and the aircraft has at least one transverse support per display unit masking at least one transverse bar, at least in part.

The aircraft can thus have a "transverse" support that is substantially horizontal. Each transverse support may be superposed on a transverse bar of the canopy.

For example, in order to carry one display unit per seat, the aircraft possesses a right transverse support suitable for carrying a right display unit directed towards the right seat, and a left transverse support suitable for carrying a left display unit directed towards the left seat.

Thus, the aircraft may include two plane transverse supports jointly forming a V-shaped tray, which is possibly horizontal.

Two transverse supports then form portions of a single V-shaped tray, the two transverse supports representing two branches of the tray. The two branches may extend transversely on either side of an anteroposterior plane of symmetry.

This configuration makes it possible in particular to obtain a transverse support that is relatively stable, in spite of the vibration to which it is subjected while the aircraft is in flight.

In addition to its utilitarian aspect, such a horizontal tray also provides a very neat appearance.

Furthermore, the aircraft may include one or more of the following characteristics.

The aircraft may have at least two supports for carrying one display unit per seat. In other words, the aircraft may have at least one left support for carrying a left display unit and at least one right support for carrying a right display unit.

In addition, the aircraft optionally includes a leg fastened to the central console, each transverse support being carried by said leg.

The aircraft thus has a central console plus a display system including a fastener member and a display unit, the fastener member extending in elevation from the central console. The fastener member then includes a leg and at least one support resting on the leg.

Each transverse support is stationary relative to the leg.

Since an aircraft, and in particular a rotorcraft, is subject to a large amount of vibration, such an arrangement seeks to minimize the effect of vibration on the display units.

Furthermore, the bars of the canopy comprise at least one bar in elevation extending in a direction going from said base towards the top of the cockpit, and the aircraft may include at least one support in elevation masking a bar in elevation, at least in part.

A bar in elevation may be substantially vertical, or oblique, or even curved. Under such circumstances, a support carrying a display unit may be superposed on such a bar in elevation.

Thus, in a first embodiment, a display unit is carried by a transverse support.

In a second embodiment, a display unit is carried by a support in elevation extending from a leg or from the console, for example.

In a third embodiment, a display unit is carried by a support in elevation and by a transverse support. For example, the support in elevation extends obliquely from a leg or from the central console towards the display unit or towards the transverse support. The display system then presents good stability, tending to avoid unwanted movements caused by vibration.

The support in elevation acts as reinforcement for holding the transverse support in position.

Furthermore, and independently of the embodiment, each display unit may be hinged to at least one support by a hinge allowing the display unit to turn about an axis in elevation.

This hinge may limit the angle through which a display unit can turn to a range of 10 degrees to 15 degrees in order to superpose the display unit as closely as possible on a transverse bar, in particular.

This narrow range enables a top corner of the display unit to be kept in superposition on a bar.

This angle of the display unit may also be constant and determined by the fastener means.

This suitably selected angle may be a compromise between minimizing masking of the outside for the other pilot and presenting information that is viewed in a plane approximately perpendicular to the line of sight when the pilot is looking at the center of the display zone.

Furthermore, the aircraft may include one reversible fastener means per display unit for temporarily fastening a display unit to a support.

Thus, the aircraft may have only a single display unit for displaying information to a pilot. The second display unit may be removed. For example, during a rescue mission in the mountains, a pilot may be accompanied by a doctor who has no need to access piloting information. The pilot can then remove the second display unit in order to increase the pilot's own field of view.

The fastener means may be conventional docking means serving firstly to fasten the display unit to a support and secondly to connect the display unit to means for transmitting information and/or for providing electrical power, for example.

Furthermore, at least one support may be hollow in order to convey members inside it.

Thus, the aircraft may include wired connections passing inside at least one support. These wired connections may include electrical power supply connections and/or data buses or the equivalent, for example.

Furthermore, or in addition, the aircraft may include at least one air conditioning duct passing inside at least one support.

In the absence of an air conditioning system, an aircraft may be constrained to remain on the ground in weather that is very cold or very hot, since the temperature can then be difficult for the crew to endure in flight. The air conditioning system may then include ducts arranged in the support for air conditioning the cockpit.

Thus, at least one support may include at least one ventilation nozzle connected to an air conditioning duct.

Likewise, or in addition, at least one display unit may include at least one ventilation nozzle connected to an air conditioning duct. Such a ventilation nozzle may be arranged on one side of a display unit so that the air conditioning duct does not present a right angle. Such a right angle tends to degrade the performance of the air conditioning system.

Furthermore, the display unit may be arranged on a line of sight of a pilot towards the front of the aircraft in order to satisfy certain regulations.

Nevertheless, the aircraft may include an additional display member capable of presenting the information required by those regulations to the pilot on the specified vision axis.

Thus, the display unit may display "mission" information such as map or chart information, with the additional display member being dedicated to piloting information such as the altitude of the aircraft, for example. Reference may be made to the literature in order to identify conventional mission information and piloting information.

Such a display member may comprise a helmet having a visor that presents the required information.

Each display unit may then be offset from the forward vision axis of a pilot in order to optimize the pilot's field of view.

Nevertheless, at least one support may be extendible in order to place a display unit in a first position laterally offsetting the display unit relative to a forward vision axis of a person sitting on one of the seats, or else in a second position positioning the display unit on said vision axis.

Thus, a pilot positions the display unit in the first position when the aircraft has an additional display member, and in the second position when it does not have this additional display member.

The display unit may present mission information in the first position and piloting information in the second position.

Furthermore, the aircraft may include at least one on-board instrument arranged on the central console.

Furthermore, each display unit may have at least two independent display screens, resulting from a single matrix or from a plurality of matrices. Thus, the failure of one screen can be mitigated by using the other screen.

In addition to an aircraft, the invention also provides a method of optimizing the outside visibility made available to a person in an aircraft having a cockpit extending longitudinally from a rear portion towards a front portion, and transversely from a left side to a right side, and extending in elevation from a base to a top, the cockpit having a canopy including transparent surfaces connected together by bars, the cockpit including a central console and two seats arranged transversely on either side of the central console. This method comprises the following steps:

arranging at least one support in the cockpit, the support being connected to the central console and each support being interposed between a bar and a theoretical position for the eye of a person sitting on one of said seats in order to optimize the outside visibility offered to that person, the theoretical position being defined by the manufacturer; and suspending a display unit from at least one support in order to display multiple indications for assisting piloting.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 1 to 3 show an aircraft of the invention;

FIGS. 6 and 7 show such a fastener member arranged in a cockpit;

FIG. 8 is a stereogram constructed for a cockpit that does not include the invention;

FIG. 9 is a stereogram constructed for the cockpit of FIG. 6;

FIG. 10 shows a fastener member comprising only one support in elevation per display units; and FIG. 11 is a view of an extendible support.

DETAILED DESCRIPTION OF THE INVENTION

Elements that are present in more than one of the figures are given the same references in each of them.

Three mutually orthogonal directions X, Y, and Z are shown in some of the figures.

The first direction X is said to be "longitudinal". The second direction Y is said to be "transverse". Finally, the third direction Z is said to be "in elevation". The term "in elevation" relates to any direction parallel to the third direction Z.

Figure 2:
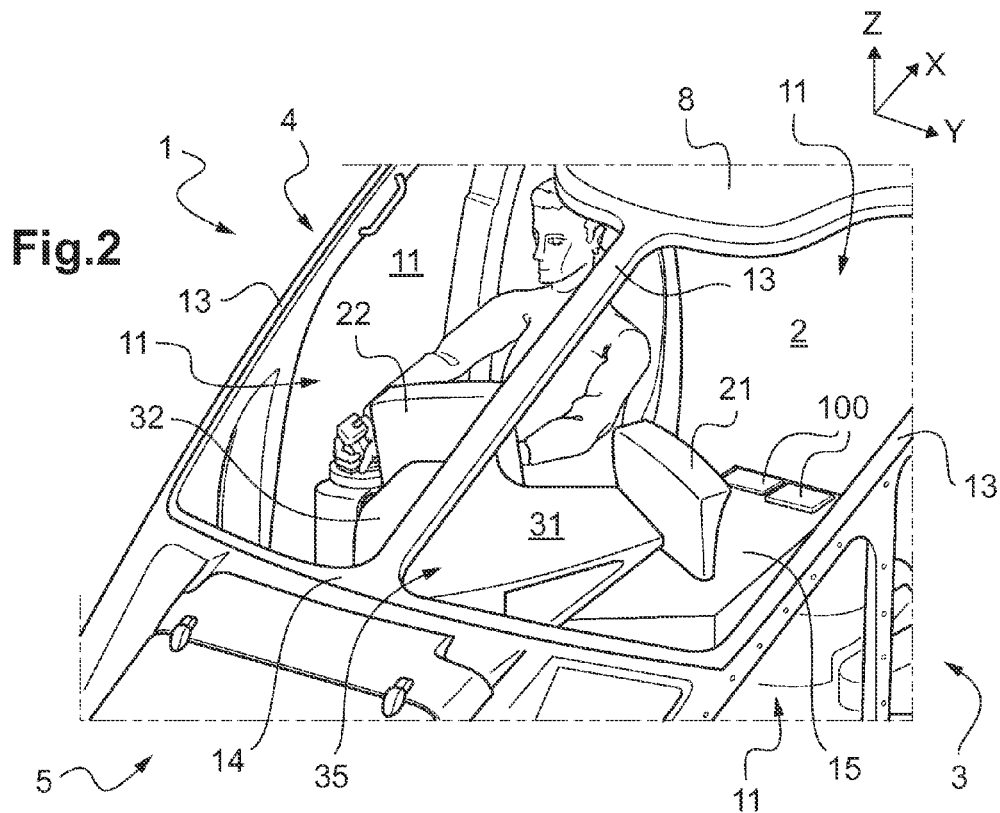
Figure 3:
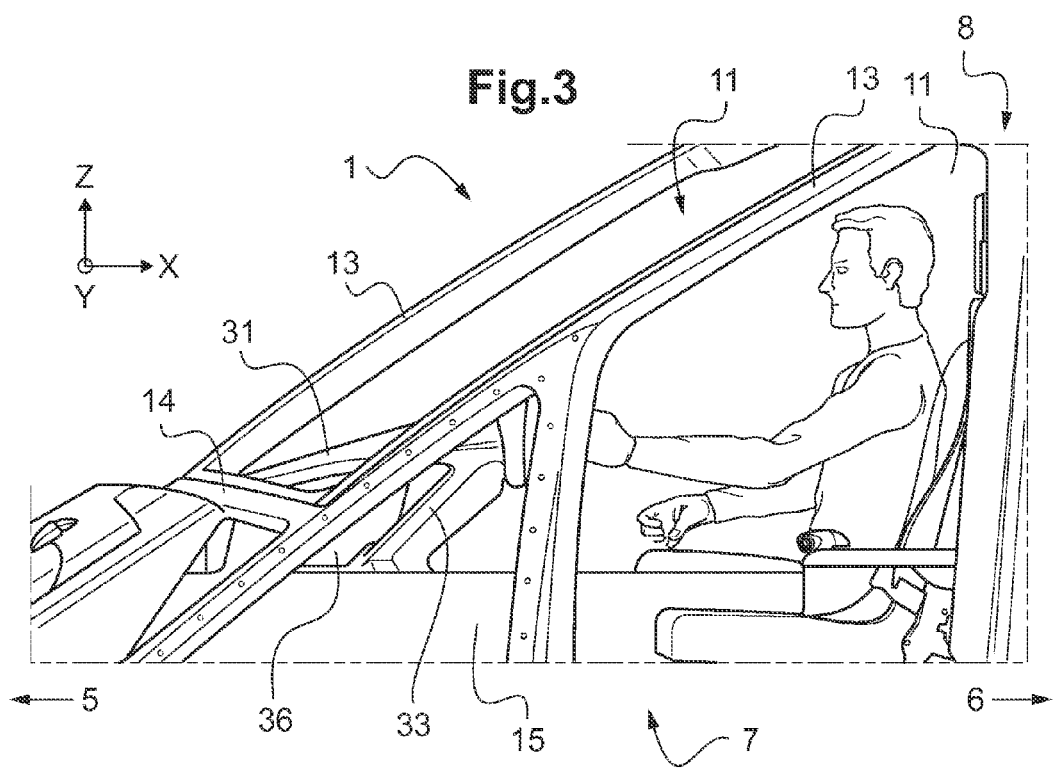

FIGS. 1 to 3 show an aircraft 1 of the invention.

With reference to FIG. 1, the aircraft 1 has a cockpit 2. The cockpit 2 extends in the longitudinal direction X along an anteroposterior plane of symmetry P1 from a front portion 5 towards a rear portion 6, along the transverse direction Y from a left side 3 to a right side 4, and along the direction in elevation from a base 7 towards a top 8.

The cockpit 2 contains in particular two seats 16 and 17, namely a left front seat 16 and a right front seat 17 arranged respectively on the left side 3 and on the right side 4. The seats may receive a pilot and a copilot, or else a pilot and a passenger. By way of example, the passenger may be a doctor during a rescue mission.

In order to enable people sitting on the seats 16 and 17 to see the outside EXT of the aircraft, the aircraft has a canopy 10.

The canopy thus has transparent surfaces 11 arranged in particular on the front portion, on the left side, and on the right side. It should be observed that a rigid and opaque nose 12 may protect the front tip of the aircraft. By way of example, this front tip is not provided with a canopy in order to protect various pieces of electronic equipment located behind the front tip, such as a radar, a battery, etc.

The transparent surfaces 11 are fastened to structural bars of the aircraft. These bars comprise bars referred to as "transverse bars 14" insofar as they extend from the left side to the right side. The bars also include bars referred to as "bars in elevation 13" insofar as they extend from the base towards the top.

Furthermore, the cockpit 2 includes a central control console 15 extending along the anteroposterior plane of symmetry P1, and passing in particular between the two seats 16, 17. This central console may include at least one on-board instrument 100, for example.

These on-board instruments may include display instruments (screens, . . . ) and associated control means (track ball, real or virtual control units, . . . ) relating to managing a mission (charts, weather, . . . ), and instruments for managing the vehicle (an instrument relating to the quantity of fuel, to the states of the engines, the electrical system, the hydraulic system, . . . ).

These control elements, elements for displaying states, and elements for monitoring or displaying information may be of conventional type (control unit, state indicator, or display screen dedicated to each function) or they may be partially integrated (of the multifunction unit type with menu keys). In a more innovative configuration, all of the functions are managed via one or more touch panels where the behavior of control modes and the display of the states of various elements of the vehicle and of mission management intermediates is the result of software incorporating all of the functions.

Furthermore, the aircraft has a display system for presenting information for assisting piloting, and concerning the surroundings. This information may include alerts, alarms, navigation information, communication information, . . . . The display mode may be of the conventional type known as a "primary flight display", optionally associated with a display of the type known as a "flight navigation display". The display may be innovative with synthetic vision type images based on three-dimensional (3D) terrain data.

The display system comprises at least one display unit 21, 22 and possibly one display unit per seat. Thus, the display system may have a left display unit 21 presenting information to a person sitting on the left seat 16, and/or a right display unit 22 presenting information to a person sitting on the right seat 17.

Figure 4:
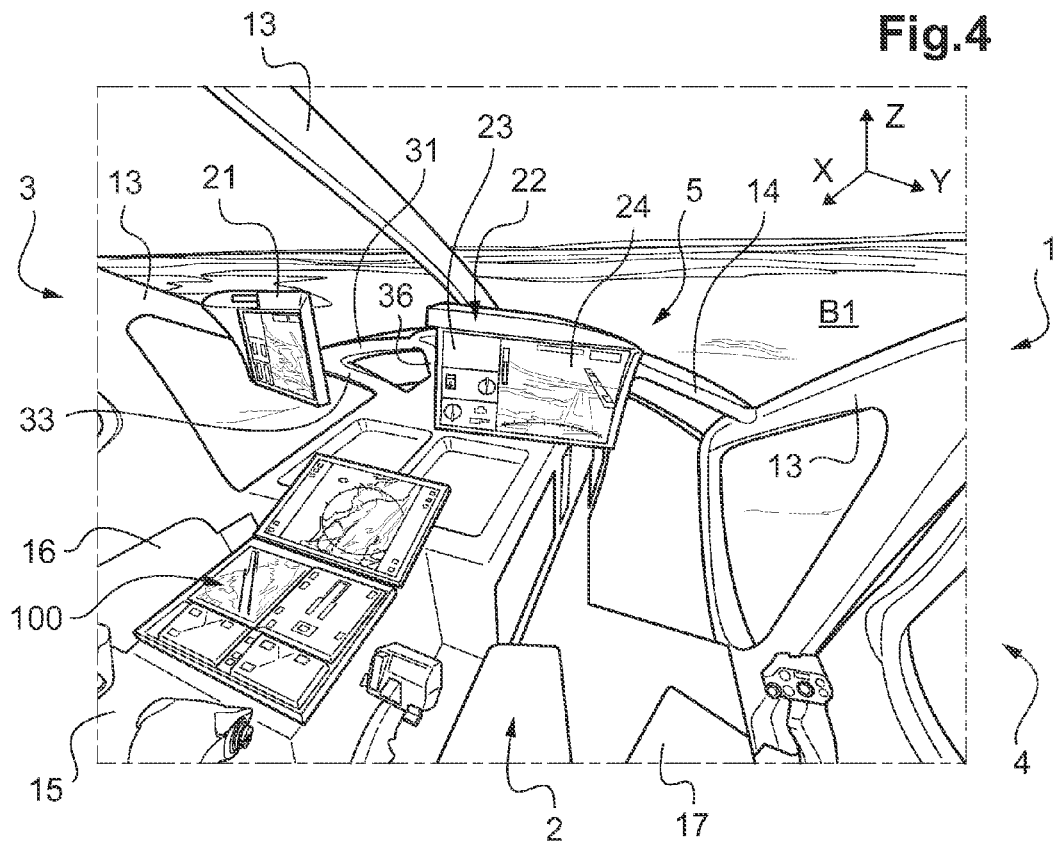
FIGS. 4 and 5 show a fastener member for display units, the fastener member being provided with supports that are transverse and in elevation.

With reference to FIG. 4, each display unit may, for safety reasons, comprise two independent screens 23, 24, possibly of dimensions that are identical, unlike that which is shown in FIG. 4.

Each screen may present a plurality of different indications corresponding to various prior art instruments.

In order to carry the display unit 21, 22, the display system has at least one support 31, 33 connected to the central console 15. Each support is thus fastened to the central console 15, either directly or else indirectly via a leg fastened to the central console 15.

In the method applied, each display unit is thus suspended from a support. In addition, each support is arranged by being interposed between a bar 13, 14 (and in particular a bar of the front portion), and a theoretical position for the eye of a person sitting on one of said two seats. Such a theoretical position is determined by the manufacturer.

FIG. 8 is a stereogram showing the field of view of the pilot in an aircraft having a conventional control panel.

The first shaded zone Z1 represents the field of view for a pilot sitting on the right front seat. This field of view is obstructed by the second shaded zone Z2 created by the central console and the instrument panel, and by the non-shaded zone Z3 created by the bars of the canopy.

Conversely, FIG. 9 is a stereogram showing the field of view of a pilot in an aircraft of the invention.

It can be seen that the zone Z2 is smaller than in the prior art. Furthermore, the view masked by the supports 31, 33 of the display units coincides with the view masked by the bars.

The invention thus significantly improves the field of view made available to a pilot.

In the example of FIG. 4, the display system has at least two supports 31, 33 per display unit to be carried.

Each display unit is carried by a transverse support 31 masking a transverse bar 14 in part, and by a support in elevation 33 masking a bar in elevation in part.

FIG. 4 shows the cockpit as seen by a pilot sitting on the right front seat 17. When the pilot is looking towards the other side of the cockpit, i.e. the left side, the transverse support 31 carrying the left display unit masks a portion of a transverse bar 14. In addition, the support in elevation 33 also carrying the left display unit masks a portion of a bar in elevation 13.

With reference to FIGS. 6 and 7, the fastener member comprises two transverse supports 31, 32 that are plane, together forming a V-shaped tray 35.

The tray 35 is carried by a leg 36 for fastening to the central console 15. A leg of large section associated with a plane transverse support extending from side to side of the leg tends to offer good stability to the fastener system.

The fastener member may thus comprise solely a leg carrying transverse supports.

Nevertheless, in the embodiment of FIGS. 6 and 7, the fastener member may also comprise one support in elevation 33, 34 per transverse support in order to stiffen it.

Each support in elevation may then extend obliquely from the leg towards the end of a transverse support carrying the display unit.

In a variant, the support in elevation may carry a display unit, the transverse support extending from the leg towards the support in elevation.

Alternatively, the transverse support and the support in elevation may be jointly connected to a display unit.

FIG. 10 shows an alternative embodiment having only one support in elevation per display unit.

Independently of the embodiment, and with reference to FIG. 6, at least one support, and where appropriate one leg, may be hollow in order to guide therein wired connections 60 and/or at least one air conditioning duct 70.

Furthermore, at least one support may include at least one ventilation nozzle 75 connected to an air conditioning duct.

Figure 5:
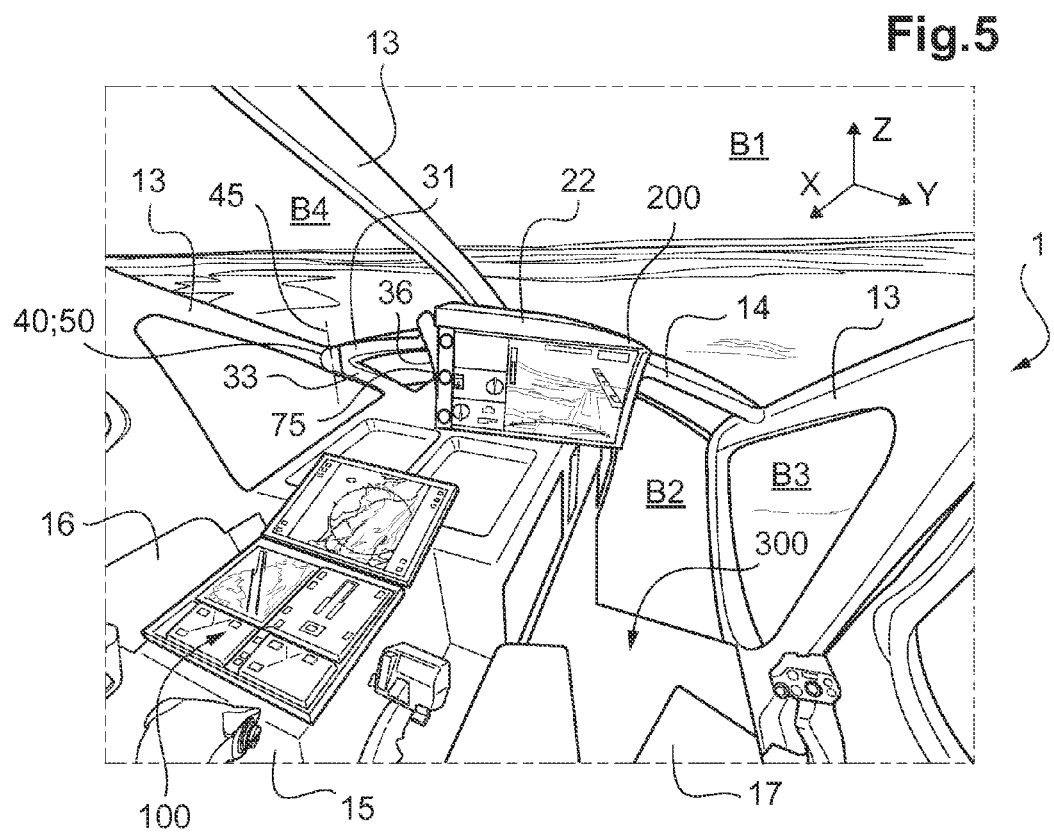

With reference to FIG. 5, at least one display unit 22 may also include at least one ventilation nozzle 75 connected to an air conditioning duct 70.

Furthermore, each display unit may be hinged to at least one support via a hinge 40 shown diagrammatically in FIG. 5. The hinge 40 allows a display unit to turn about an axis in elevation 45 over a narrow range.

By way of example, this range makes it possible to keep a corner 200 of a display unit superposed on a bar. For example, the top right corner of the right display unit and the top left corner are superposed on a bar.

In addition, each display unit may be fastened reversibly to a support by fastener means 50.

The fastener means 50 may be hinged by a hinge 40 to a support.

It should be observed that by removing a display unit, the field of view of a pilot is increased significantly.

Independently of the presence of one or two display units, the aircraft presents a pilot with a first vision zone B1 towards the front of the aircraft, a second vision zone B2 towards the front and downwards, a third vision zone B3 towards the right side, and a fourth vision zone B4 towards the left side.

In addition, the aircraft may optionally possess a downward vision zone made available for example by a viewing mat 300 showing the surroundings situated under the aircraft.

Furthermore, certain regulations may require mission information to be displayed in a forward vision field.

The aircraft may then include a helmet or any other equivalent means for displaying such information so that the display unit obscures as little as possible of the first zone B1.

Nevertheless, it is possible to arrange the display unit in the position required by such a regulation, in the absence of such a helmet.

Consequently, and with reference to FIG. 11, at least one support may be extendible in order to place a display unit 21, 22 either in a first position POS1 laterally offsetting the display unit 21, 22 from a forward vision axis AX1 of a person, or else in a second position POS2 positioning said display unit 21, 22 on said vision axis AX1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft having a cockpit extending longitudinally from a rear portion towards a front portion and transversely from a left side towards a right side, and in elevation from a base towards a top, the cockpit comprising a canopy having transparent surfaces fastened to bars, the cockpit including a central console and two seats arranged transversely on either side of the central console, wherein the aircraft includes at least one support connected to the central console and at least one display unit for displaying multiple indications for assisting piloting, the at least one display unit being carried by the at least one support, the at least one support being interposed between one of the bars and a theoretical position for the eye of a person sitting on one of the two seats, the at least one support visually masking of one of the bars at least in part in order to optimize the outside visibility made available to that person, the theoretical position being defined by the manufacturer, the bars comprising at least one transverse bar extending transversely in a direction from the right side to the left side, the at least one support including at least one transverse support that masks the at least one transverse bar at least in part, at least two plane transverse supports jointly forming a V-shaped tray.

2. An aircraft according to claim 1, wherein the aircraft has at least two supports for carrying one display unit per seat.

3. An aircraft according to claim 1, wherein the V-shaped tray is a horizontal tray.

4. An aircraft according to claim 1, wherein the aircraft includes a leg fastened to the central console, the at least one transverse support being carried by the leg.

5. An aircraft according to claim 4, wherein the at least one transverse support is stationary relative to the leg.

6. An aircraft according to claim 1, wherein the bars comprise at least one bar in elevation extending in a direction going from the base towards the top, the aircraft including at least one support in elevation masking the at least one bar in elevation at least in part.

7. An aircraft according to claim 1, wherein the at least one display unit is hinged to the at least one support by a hinge allowing the display unit to turn about an axis in elevation.

8. An aircraft according to claim 1, wherein the aircraft includes one reversible fastener means per display unit for temporarily fastening the at least one display unit to the at least one support.

9. An aircraft according to claim 1, wherein the at least one support is extendible in order to place the at least one display unit in a first position (POS1) laterally offsetting the display unit from a forward vision axis (AX1) of a person sitting on one of the seats, or else in a second position (POS2) positioning the display unit on the forward vision axis (AX1).

10. An aircraft according to claim 1, wherein the at least one support is hollow.

11. An aircraft according to claim 10, wherein the aircraft includes wired connections passing inside the at least one support.

12. An aircraft according to claim 10, wherein the aircraft includes at least one air conditioning duct passing inside the at least one support.

13. An aircraft according to claim 12, wherein the at least one support includes at least one ventilation nozzle connected to the least one air conditioning duct.

14. An aircraft according to claim 12, wherein the at least one display unit includes at least one ventilation nozzle connected to the at least one air conditioning duct.

15. An aircraft according to claim 1, wherein the aircraft includes at least one on-board instrument arranged on the central console.

16. An aircraft according to claim 1, wherein the at least one display unit includes at least two independent screens.

17. A method of optimizing outside visibility made available to a person in an aircraft having a cockpit extending longitudinally from a rear portion towards a front portion, and transversely from a left side to a right side, and extending in elevation from a base to a top, the cockpit having a canopy including transparent surfaces connected together by bars, the cockpit including a central console and two seats arranged transversely on either side of the central console, the bars comprising at least one transverse bar extending transversely in a direction from the left side to the right side, the method being characterized by the following steps:

arranging at least one support in the cockpit, the support being connected to the central console and the support being interposed between one of the bars and a theoretical position for the eye of a person sitting on one of the seats in order to optimize the outside visibility offered to that person, the theoretical position being defined by the manufacturer, the support including at least one transverse support masking the at least one transverse bar, at least in part, at least two plane transverse supports together forming a V-shaped tray; and suspending a display unit from at least one support in order to display multiple indications for assisting piloting.

* * * * *